United States Patent [19]

Randin

[11] 4,175,838

[45] Nov. 27, 1979

[54] ELECTRO-OPTIC DEVICE

[75] Inventor: Jean-Paul Randin, Cortaillod, Switzerland

[73] Assignee: Ebauches S.A., Neuchatel, Switzerland

[21] Appl. No.: 829,798

[22] Filed: Sep. 1, 1977

[30] Foreign Application Priority Data

Sep. 14, 1976 [CH] Switzerland .................. 11631/76

[51] Int. Cl.$^2$ .......................... G02F 1/17; G02F 1/23
[52] U.S. Cl. ................................. 350/357; 252/408
[58] Field of Search ..................... 252/408; 350/357

[56] References Cited

U.S. PATENT DOCUMENTS

| 3,451,741 | 6/1969 | Manos | 350/357 |
|---|---|---|---|
| 3,806,229 | 4/1974 | Schoot et al. | 350/357 |
| 3,912,368 | 10/1975 | Ponjee et al. | 350/357 |
| 3,930,717 | 1/1976 | McDermott et al. | 350/357 |
| 3,970,365 | 7/1976 | Giglia | 350/357 |
| 4,073,570 | 2/1978 | Korinek | 350/357 |
| 4,116,546 | 9/1978 | Leibowitz | 350/357 |
| 4,127,853 | 11/1978 | Leibowitz | 350/357 |

FOREIGN PATENT DOCUMENTS 2603200 8/1976 Fed. Rep. of Germany .......... 350/357

OTHER PUBLICATIONS

Chang, I. F., IBM Tech. Discl. Bull., vol. 17, No. 10, pp. 3146-3147, (1975).

Primary Examiner—Benjamin R. Padgett
Assistant Examiner—T. S. Cron
Attorney, Agent, or Firm—Silverman, Cass & Singer, Ltd.

[57] ABSTRACT

An electro-optic device comprising a transparent conductive layer and an electrochromic layer applied thereon together constituting an electrode, a counter-electrode spaced from said electrode and an intermediate electrolyte; the electrolyte containing a reductant capable of forming, during operation of the device, an electrochemical couple whose potential is more anodic than the oxidation potential of the electrochromic layer to prevent an increase of the potential during bleaching of the electrochromic layer markedly reducing deterioration of the electrolyte.

9 Claims, 1 Drawing Figure

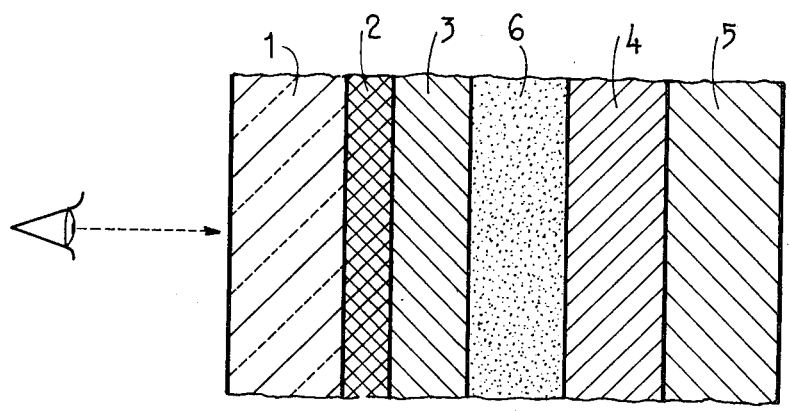

ELECTRO-OPTIC DEVICE

The present invention relates to an electro-optic device comprising a transparent conductive layer, an electrochromic layer applied on the said transparent layer, these two first elements constituting together an electrode, a counter-electrode maintained at a distance from the said first electrode and an electrolyte ensuring, at least indirectly, a ionic binding between the electrode and the counter-electrode.

Several electro-chromic devices are already known which can be used, for instance, as display cells.

These devices are constituted with a glass plate carrying transparent conductive tracks which are themselves covered with an electrochromic layer, for instance tungsten trioxide ($WO_3$), in the areas intended to serve to the display. An electrolyte containing one or several pigments is interposed between this plate, constituting an electrode, and a second electrode, called counter-electrode, which can be made of graphite, for instance.

The experience shows that, in such devices, when the electrolyte is pure polystyrene sulfonic acid (PSSA), after a long running a brown colouration of the electrolyte in contact with the electrochromic layer, for instance $WO_3$, and the conductive tracks made of $SnO_2$ is produced.

The purpose of the present invention is to furnish an efficient means for preventing the colouration of the electrolyte constituted by PSSA in contact with the electrochromic layer and with the conductive tracks.

The electro-optic device according to the invention is characterized by the fact that its electrolyte contains a reducer able to form, during the operation of the device, an electrochemical couple whose potential is more anodic than the oxidation potential of the electrochromic layer, so as to prevent an increase of the potential, during bleaching of the electrochromic layer, that would produce the deterioration of the electrolyte.

The drawing shows, by way of example, one embodiment of the object of the invention.

The sole FIGURE is a view of a portion of an electro-optic display cell.

The cell represented comprises a glass plate 1 on some portions of the lower face of which is applied a transparent conductive layer 2 made of tin oxide ($SnO_2$) constituting conductive tracks, on which is applied an electrochromic layer 3, for instance tungsten trioxide ($WO_3$), the whole constituting the electrode of the cell.

The counter-electrode is constituted by an electrochromic layer 4, made of $WO_3$, previously cathodically polarized at $-1,0$ V vs $Hg/Hg_2SO_4$ in an aqueous solution of sulfuric acid at 10%, deposited on a substrate 5 constituted, for instance, by a plate of glass covered with the conductive layer of $SnO_2$. p The electrolyte 6, for instance a paste comprising polystyrene sulfonic acid (PSSA), added with pigments, is interposed between the electrode and the counter-electrode.

It is to be noted that the conductive layer 2 could not constitute tracks on the glass plate 1 but could cover this plate entirely in the case, for instance, the electro-optic cell would serve to other purposes than the display of information.

One adds to the PSSA about 2% of a reducer constituted of ions $Br^-$ (% $Br^- = (Br^-/PSSA) \times 100$).

The presence of these $Br^-$ ions produces, when the cell is operating, the following electrochemical reaction:

$$2\ Br^- \rightleftharpoons Br_2 + 2e^-$$

the electrochemical potential $E_o$ of which, i.e. 1,065 V, is more anodic than the oxidation potential of the electrochromic layer 4. This electrochemical reaction, as shown by the experience, has a protecting effect for the polystyrene sulfonic acid.

As a matter of fact, it has been ascertained that, without bromide, the APSS is brown coloured during the operation of the cell. After a couple of millions of cycles, the PSSA is brown, so that the cell does not have a nice looking appearance anymore.

If, on the contrary, bromide is added to the electrolyte, one ascertains that the useful lifetime of the cell is increased significantly (by a factor of at least ten). If the concentration of bromide is too small, the protection is not sufficient; if, on the contrary, it is too high, the bromine formed by the electrochemical reaction produces red areas after a certain time of operation.

It is preferable to use an electrochemical or redox couple which is colorless in both oxidation states, the reducer and the oxidant of which are transparent, for instance the couple $Fe^{2+}/Fe^{3+}$ the equilibrium potential $E_o$ of which is 0.69 V.

The concentration in additive can also be limited by the fact that, according to the conditions of operation, and if $SnO_2$ is in contact with the electrolyte, the bleaching process $H_xWO_3 \rightarrow WO_3 + xH^+ + xe^-$ is accelerated by the cathodic reduction $Br^2 + 2e^- \rightarrow 2Br^-$ on the $SnO_2$. It is obvious that, if self-bleaching is desired, one will have a tendency to increase the concentration of additive. On the contrary, if a memory effect extending on long periods is desired, one will prevent an arrangement where the $SnO_2$ is directly exposed to the electrolyte containing the additive.

In the example of electro-optic device as disclosed hereabove, one could also use other electrochemical couples while choosing them preferably so that the reducer and the oxidant be colorless, for instance the couples hydroquinone/quinone, tetrachloro-p-hydroquinone/tetrachloro-p-benzoquinone (chloranil), vanadium III ($V^{3+}$)/vanadium IV ($VO^{2+}$), thallium I ($Ti^+$)/thallium III ($Tl^{3+}$).

The choice of other additives will be conditioned by the materials used for the conductive tracks, for the electrochromic layer and for the electrolyte. As a matter of fact, the additive as choosen must not react chemically with one or the other of the active constituants, otherwise the protective effect will be distroyed. It is moreover necessary that the reaction of oxido-reduction be reversible so that the reducer be regenerated during the colouration of the cell.

The mechanism of the protection can be described as follows:

When, in view of the bleaching of the information, one lets a positive current to pass from the electrode coated with the electrochromic layer to the counter-electrode, one produces the anodic oxidation:

$$H_xWO_3 \rightarrow WO_3 + xH^+ + x\ e^-$$

This has for effect to let the electrochromic layer passing from the coloured condition to the transparent condition (bleaching). If one continues to apply the current while the decolouration has ended, the potential will increase and will reach the value where the reactions of degradation of the PSSA may occur.

These reactions of degradation have for effect to oxidize the PSSA. By the addition of bromide, the reactions of oxidation of the PSSA are not produced since the electric load is absorbed by the reaction:

$$2Br^- \rightarrow Br_2 + 2e^-$$

The reaction being reversible, the bromide is regenerated during the reaction of colouration.

What I claim is:

1. Electro-optic device comprising a transparent conductive layer, and electrochromic layer consisting of a transition metal oxide applied on the said transparent layer, these two first elements constituting together an electrode, a counter-electrode maintained at distance from the said first electrode, and an electrolyte ensuring an ionic connection between the electrode and the counter-electrode, characterized by the fact that the said electrolyte is polystyrene sulfonic acid containing a reductant able to form, during the operation of the device, a redox couple with an equilibrium more anodic than the oxidation potential of the electrochromic layer, so as to prevent an increase of the potential during bleaching of the electrochromic layer that would produce the deterioration of the electrolyte.

2. Electro-optic device as claimed in claim 1, characterized by the fact that the said reductant and the corresponding oxidant formed during the operation of the device are colorless.

3. Electro-optic device as claimed in claim 1, characterized by the fact that the said reductant is bromide ($Br^-$) constituting a redox couple the oxidant of which is bromine ($Br_2$).

4. Electro-optic device as claimed in claim 3, characterized by the fact that the content in bromide is of 2% of the electrolyte.

5. Electro-optic device as claimed in claim 1, characterized by the fact that the said reductant is ferrous iron ($Fe^{2+}$) constituting a redox couple the oxidant of which is ferric iron ($Fe^{3+}$).

6. Electro-optic device as claimed in claim 1, characterized by the fact that the said reductant is hydroquinone constituting a redox couple the oxidant of which is the quinone.

7. Electro-optic device as claimed in claim 1, characterized by the fact that the said reductant is tetrachloro-p-hydroquinone constituting a redox couple the oxidant of which is tetrachloro-p-benzoquinone (chloranil).

8. Electro-optic device as claimed in claim 1, characterized by the fact that the said reductant is vanadium III constituting a redox couple the oxidant of which is vanadium IV.

9. Electro-optic device as claimed in claim 1, characterized by the fact that the said reductant is thallium I constituting a redox couple the oxidant of which is thallium III.